United States Patent [19]
Fitzgerald et al.

[11] Patent Number: 5,605,306
[45] Date of Patent: Feb. 25, 1997

[54] MECHANICAL TOW LINE REGULATION SYSTEM FOR AN AIRBORNE TOWED AEROBODY

[75] Inventors: Patrick J. Fitzgerald, Northridge; John T. Fialko, Long Beach; Joseph A. Wysocki, Malibu, all of Calif.; Ronald B. Chesler, Tucson, Ariz.

[73] Assignee: Hughes Electronics, Los Angeles, Calif.

[21] Appl. No.: 371,308

[22] Filed: Jan. 11, 1995

[51] Int. Cl.⁶ .................. B64D 3/00; B64F 1/04; B63B 21/60; F41F 5/00
[52] U.S. Cl. ............. 244/1 TD; 244/63; 244/110 A; 273/360; 273/361; 89/1.51; 89/1.57; 89/1.34; 114/292
[58] Field of Search ................ 244/1 TD, 33, 244/63, 110 R, 110 A, 137.4; 273/360, 361; 89/1.34, 1.51, 1.57, 1.811; 114/292, 293

[56] References Cited

U.S. PATENT DOCUMENTS

| | | | |
|---|---|---|---|
| 2,392,199 | 1/1946 | Steiger | 244/33 |
| 2,650,127 | 8/1953 | Carlson | 89/1.57 |
| 2,889,895 | 6/1959 | Snow | 244/110 A |
| 3,810,671 | 5/1974 | Jeffery | 89/1.57 |
| 4,327,644 | 5/1982 | Stancil | 89/1.34 |
| 4,718,320 | 1/1988 | Brum | 244/1 TD |
| 4,770,368 | 9/1988 | Yates et al. | 273/361 |
| 4,852,455 | 8/1989 | Brum | 244/1 TD |
| 4,903,607 | 2/1990 | Clark | 89/1.34 |
| 5,035,169 | 7/1991 | Chapin et al. | 89/1.34 |

*Primary Examiner*—Gregory L. Huson
*Assistant Examiner*—Lissi Mojica
*Attorney, Agent, or Firm*—Leonard A. Alkov; Wanda K. Denson-Low

[57] ABSTRACT

A mechanical regulation system for controlling tow line payout between the aerobody and a towing vehicle. The system comprises a housing, a nonrotating spool, and a tow line wound around the spool that is coupled between the aerobody and the vehicle. The regulation portion of the present system comprises a rotatable wedge-shaped tube, having the tow line wrapped around it. A rotatable mechanical regulator is slidably coupled to the wedge-shaped tube. The regulator is adapted to rotate with the tube and move transversely along the length of the tube as the tow line is removed from the spool. A brake mechanism is provided as part of the regulator, and a brake drum is disposed adjacent the periphery of the regulator that is contacted by the brake mechanism.

6 Claims, 2 Drawing Sheets

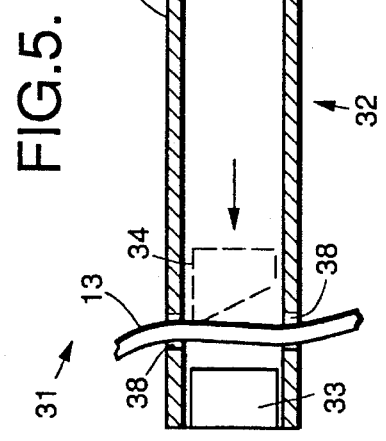
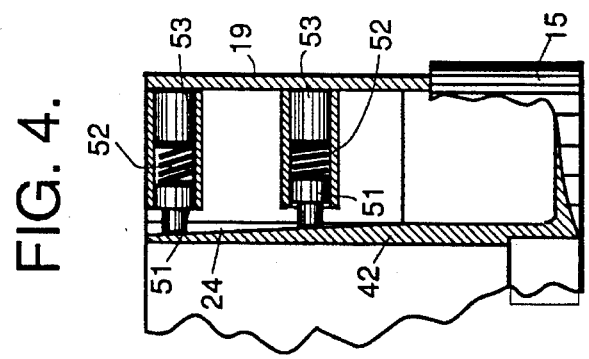
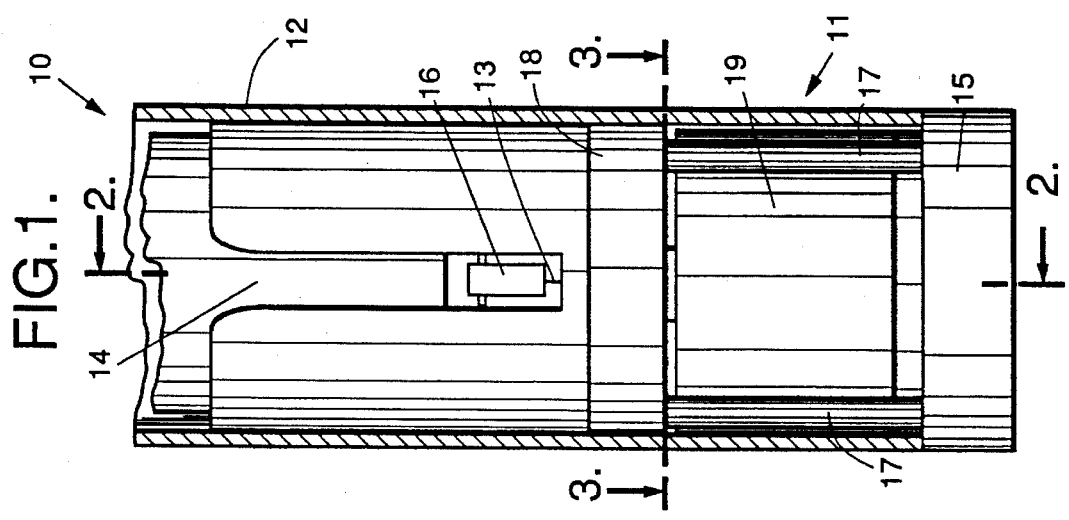

MECHANICAL TOW LINE REGULATION SYSTEM FOR AN AIRBORNE TOWED AEROBODY

BACKGROUND

The present invention relates to mechanical regulation systems, and more particularly, to a mechanical regulation system that provides for controlled tow line payout between a towed aerobody and a towing vehicle.

The closest prior art to the present invention is used in the existing ALE-50 towed decoy, currently in the inventory of the U.S. Armed Forces. The ALE-50 system is comprised of a decoy, a housing and a reel/payout mechanism. The ALE-50 system uses three copper wires to act as a data link between the decoy and a host aircraft that tows the decoy. The ALE-50 system uses a rotating reel with mechanical braking and sliprings for the data link. The ALE-50 system has a rotating tow line reel which uses the sliprings to bridge the rotating coupling between the stationary housing and the rotating reel. As a result of using the rotating reel, a mechanical braking system must be used which adds weight, increases the complexity of the system and reduces the space available for tow line storage.

Therefore it is an objective of the present invention to provide for an improved towing and deployment mechanism for a towed aerobody that eliminates the use of sliprings and rotating payout reel.

SUMMARY OF THE INVENTION

In order to meet the above objective, the present invention provides for a mechanical regulation system that provides for controlled tow line payout between the towed aerobody and a towing vehicle. The system comprises a housing, a nonrotating spool disposed in the housing, and a tow line wound around the nonrotating spool that is coupled between the towed aerobody and the towing vehicle. The regulation mechanism of the present system comprises a rotatable wedge-shaped tube is disposed in the housing, and the tow line is wrapped around it. A rotatable mechanical regulator is slidably coupled to the rotatable wedge-shaped tube. The regulator is adapted to rotate with the tube and move transversely along the length of the tube as the tow line is removed from the spool. A brake mechanism is disposed in the rotatable mechanical regulator, and a brake drum is disposed adjacent the periphery of the regulator that is contacted by the brake mechanism.

The present invention thus incorporates a controlled rate payout mechanism that does not use sliprings or a rotating payout reel. The controlled rate payout mechanism allows a conductive wire, fiber optic and/or composite tow line to be dispensed from the present invention. The payout mechanism provides a proportional control system that reduces the tow line payout rate as the tow line pays-out from the housing, and/or as payout velocity increases, thus providing a smooth stop at the end of the tow line. This eliminates any sudden jerking motion which could damage or break the tow line. The payout mechanism may use a fiber optic or electrical data link from a towing aircraft to the towed aerobody. The present invention eliminates the rotating reel and the associated electrical sliprings present in prior art systems and therefore requires fewer parts. This simplified design and reduction in parts count significantly reduces the recurring unit manufacturing cost of existing and future designs. The present invention thus provides a cost-effective improvement to existing towed aerobody systems.

By eliminating the rotating tow line reel and electrical sliprings, a better and more reliable electrical or fiber optic joint is made. This improves the integrity of the fiber optic and electrical connection thus increasing the reliability of the system. More importantly, the present mechanism allows for the use of a fiber optic tow line (or other tow line) with uninterrupted transmission of the fiber optic or electrical signal. Conventional towed aerobody deployment mechanisms relied on rotating tow line reels with sliprings that preclude the use of fiber optics in the tow line due to optical system requirements. The advantages of using the fiber optic tow line of the present invention are faster data communication rates, no electromagnetic interference, lower loss so that longer tow line lengths can be used, and fiber optic lines are immune to electrical jamming. The fiber optic tow lines also have a lower radar cross section compared to metal lines, and do not act as antennas or create electromagnetic interference (EMI) or a radar cross section.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a side view of a portion of a towed aerobody system employing a controlled rate payout mechanism in accordance with the principles of the present invention;

FIG. 4 is a view of the system of FIG. 3 taken along the lines 4—4; and

FIG. 5 shows a severing mechanism employed in the system of FIG. 1.

DETAILED DESCRIPTION

Figure 2:
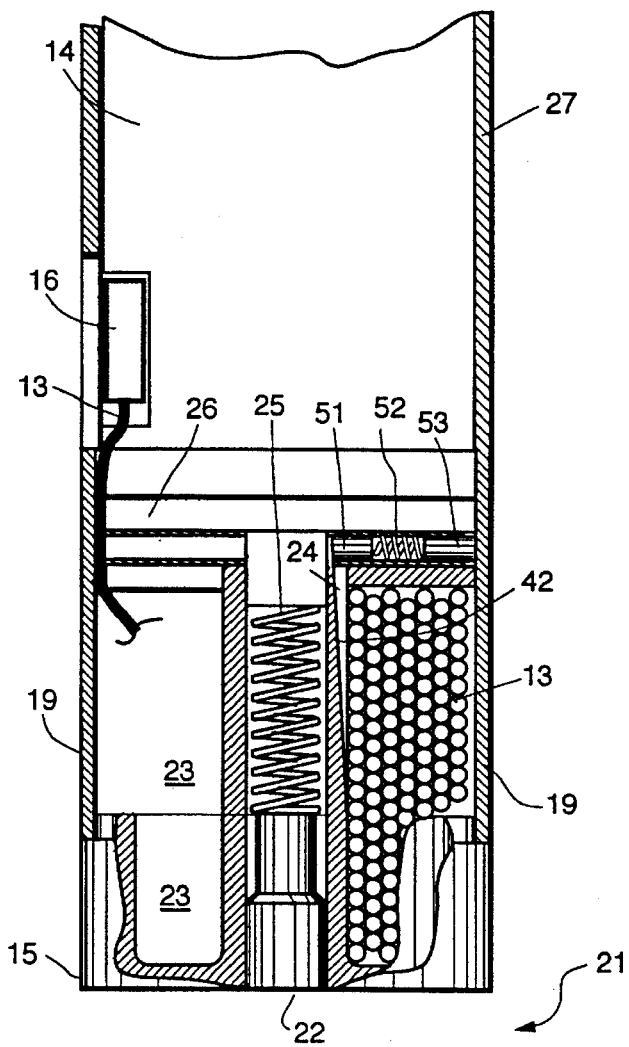
FIG. 2 is a cross sectional view of the system of FIG. 1 taken along the lines 2—2.

Referring to the drawing figures, FIG. 1 is a side view of a portion of a towed aerobody system 10 employing a deployment and controlled rate mechanical payout mechanism 11 in accordance with the principles of the present invention. The payout mechanism 11 is comprised of a housing 12 that holds a tow line 13 (fiber optic, composite, or a hybrid) and a towed aerobody 14. The housing 12 contains the aerobody 14, the payout mechanism 11 and the tow line 13 prior to deployment. The housing 12 is a rectangular metal box having blindmate connectors (not shown) disposed at one end and a protective dust cap (not shown) disposed at the other. The housing 12 typically has a square cross section, but it is not limited to any particular cross sectional shape. The blindmate connectors are mounted in a base block 15. The aerobody 14 has a tow line adapter 16 coupled between it and the tow line 13. A plurality of spacers 17 (typically 4) separate the base block from an upper mounting block 18. A regulator brake drum 19 is disposed between the base block 15 and the upper mounting block 18 and is separated by the spacers 17.

Referring to FIG. 2, it shows a partially cut-away cross sectional view of the system 10 of FIG. 1 taken along the lines 2—2, detailing the internal structure of the system 10. The base block 15 mates to a magazine 21. Impulse cartridges 22 are mounted in the magazine 21 and are used to deploy the aerobody 14 and sever the tow line 13 at the end of the life of the aerobody 14. Attached to the base block 15 and covered by the housing 12 is a fixed, nonrotating spool 23 that holds the tow line 13. The tow line is wrapped around the spool in a conventional manner. Located in the center of the spool 23 is a wedge-shaped tube 24 that contains a spring piston 25 that comprises a round disc 26 at the end thereof that faces the aerobody 14. The inside of the wedge-shaped tube 24 acts as a guide for the spring piston 25. The piston 25 and tube 24 confine expanding gasses generated by a selected one of the impulse cartridges 22 that causes the spring piston 25 to move and launch the aerobody 14.

The spring piston 25 is used to transmit gas pressure from the selected impulse cartridge 22 located in the middle of the base block 15 to the disc 26 adjacent the aerobody 14. The spring piston 25 reduces the initial forces exerted on the aerobody 14 at launch due to the compression of the spring piston 25, and then pushes the aerobody 14 out of the housing 12, driven by expanding gases from the selected impulse cartridge 22 and the stored mechanical energy of the spring piston 25. The disk 26 is used to distribute the force from the spring piston 25 over a load ring located on the outer diameter of the aerobody 14. In this manner ejection forces are directly transmitted to the aerobody 14, thus leaving the forward face of the aerobody 14 available to receive a payload.

Mounted above the spool 23 on the four spacers 17 (or standoffs) is an aerobody retaining ring 27. The retaining ring 27 holds the aerobody 14 in the housing 12 and aligns the aerobody 14, the ejection disc 26, and spring piston 25. During ejection, the housing 12 acts as a guide for the ejection disk 26 and the aerobody 14.

Figure 3:
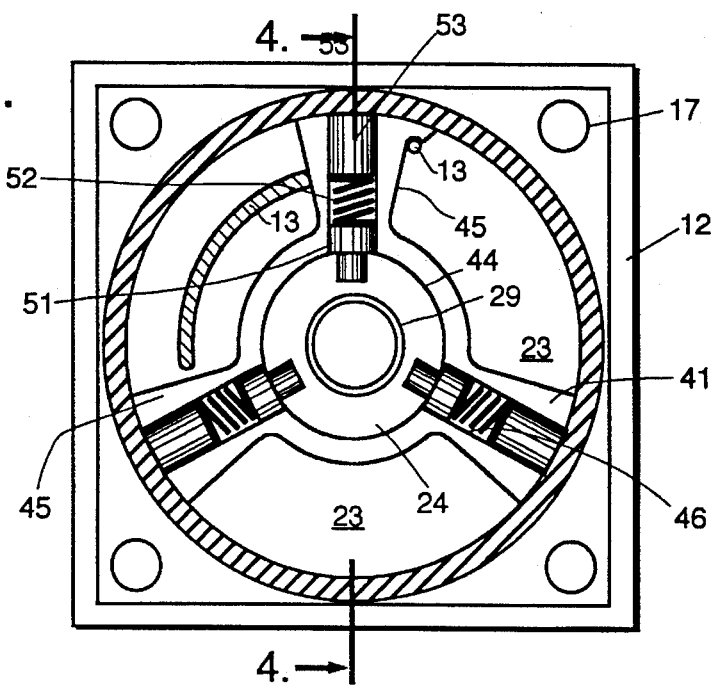
FIG. 3 is a view of the system of FIG. 1 taken along the lines 3—3.

FIG. 3 is a view of the system 10 of FIG. 1 taken along the lines 3—3. Referring to FIG. 3, a mechanical regulator 41 and the wedge-shaped tube 24 is disposed on a cylinder 29 surrounding the spring piston 25. The regulator 41 is adapted to rotate as the tow line 13 is removed from the spool 23. This is the heart of the controlled deployment mechanism 11 of the present invention. The regulator 41 and wedge-shaped tube 24 are free spinning on the spring piston cylinder 29. The regulator 41 is also adapted to move transversely along the length of the wedge-shaped tube 24. The wedge-shaped tube 24 is a hollow cylinder having ribs that run the length thereof. The ribs are tapered, to provide the wedge shape, and the wedged shape become wider at the bottom of the tube 24. Transverse movement allows the regulator 41 to move down the wedge-shaped tube 24 as the height of the tow line 13 is reduced, due to payout of the tow line 13. This is critical to maintaining a proper distance between the regulator 41 to the tow line 13. The transverse movement also controls the speed of the regulator 41 by increasing the braking force.

The regulator brake drum 19 is mounted between the base block 15 and the aerobody retaining ring 27. The regulator 41 spins inside the brake drum 19. The brake drum 19 has a fine continuous spiral thread cut into its inside surface. The regulator 41 has a central hub 44 which has three arms 45 radiating outwardly, spaced 120 degrees apart. As the tow line 13 comes off the spool 23, it slides along the inside of one of the regulator arms 45 pushing the regulator 41 around the spool 23 in front of it. The three arms 45 have a free fit relative to the brake drum 19 to allow the regulator 41 to rotate within the brake drum 19. The arms 45 also have slots 46 cut into them that will be described with reference to FIG. 4.

FIG. 4 is a view of the system 10 of FIG. 3 taken along the lines 4—4. Referring to FIG. 4, the slots 46 are cut perpendicular to the axis of rotation of the regulator 41. Weights 51, a spring 52 and a brake pad 53 are disposed in the slots 46. The weights 51 ride on the wedge-shaped tube 24 and the brake pad rides on the brake drum 19.

As the regulator 41 spins the brake pads 53 move to the end of the arms 45 due to centrifugal force, and rub on the brake drum 19. The friction between the brake drum 19 and the brake pads 53 creates a force which slows or inhibits the rotation of the regulator 41. This frictional force is directly proportional to the pressure of the brake pad 53 on the brake drum 19. The pressure the brake pad 53 exerts on the brake drum 19 is directly proportional to the rate at which the regulator 41 spins. Thus the faster the regulator 41 spins the greater the braking force.

The brake pads 53 also catch on the fine continuous spiral thread cut into the inside surface of the brake drum 19. The catching action is similar to a screw in a threaded hole, wherein the regulator 41 represents the screw and the brake drum 19 represents the threaded hole. The result is that the regulator 41 moves closer to the winding as the winding decreases in size, preventing the tow line 13 from fouling upon itself or winding up on the wedge-shaped tube 24.

As the regulator 41 moves down the wedge-shaped tube 24, the weights 51 ride up on wedges 42 and press on the spring 52 which in turn presses on the brake pads 53, thus increasing the effective pressure the brake pads 53 exert on the brake drum 19. This increases the braking force and reduces the rate at which the tow line 13 unwinds off of the spool 23. Therefore, as the end of the tow line 13 is reached, the tow line 13 payout rate is reduced. The braking force is steadily increased until regulator speed is minimal. This creates a smooth stopping motion and minimizes tension in the tow line 13 as the end of the tow line 13 is reached. The result is control mechanism 11 wherein control is related to the deployment speed as well as the amount of tow line 13 left on the winding.

Referring to FIG. 5, built into one of the spacers 17 is a severing mechanism 31. The severing mechanism 31 is comprised of a tube type cylinder comprising the spacer 17, an anvil 33 and a piston cutter 34. The tube type cylinder 32 acts as a standoff and contains the piston cutter 34 and anvil 33. The piston cutter 34 has a sharp edge 35 on one end and a flat surface 36 on the other. This piston cutter 34 is driven by the gas from a second impulse cartridge 37 located in the magazine 21 of the housing 12. When the second impulse cartridge 37 is fired the piston cutter 34 is driven toward the anvil 33 by the expanding gas therefrom. The tow line 13 is routed through holes 38 in the tube and between the piston cutter 34 and the anvil 33. The sharp edge 35 severs the tow line 13 when the piston cutter 34 impacts the anvil 33 with the tow line 13 between them.

Thus there has been described a new and improved mechanical regulation system that provides for controlled tow line payout between a towed aerobody and a towing vehicle. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A mechanical regulation system for use in airborne tow line payout between a towed aerobody and a towing vehicle, said system comprising:

a housing;

a nonrotating member disposed in the housing;

a tow line wound around the nonrotating member and coupled between the towed aerobody and the towing vehicle;

a rotatable wedge-shaped tube disposed in the housing;

a rotatable mechanical regulator slidably coupled to the rotatable wedge-shaped tube that is adapted to rotate with the tube and move transversely along the length of the tube as the tow line is removed from the nonrotating member;

a brake mechanism disposed in the rotatable mechanical regulator; and a brake drum disposed around the periphery of the rotatable mechanical regulator that is adapted to be contacted by the brake mechanism.

2. The mechanical regulation system of claim 1 further comprising:

a spring piston disposed within the wedge-shaped tube and wherein the regulator and wedge-shaped tube are adapted to rotate around the spring piston.

3. The system of claim 1 wherein the wedge-shaped tube comprises a hollow cylinder with ribs that run the length of the tube, and wherein the ribs are tapered to form wedges, and the wedges become wider at an end of the tube distal from the aerobody.

4. The system of claim 1 wherein the regulator comprises a central hub having a plurality of arms radiating outwardly and wherein the arms have slots cut into them that are disposed generally perpendicular to the axis of rotation of the regulator, and wherein each slot comprises a weight that contacts the wedge-shaped tube, a brake pad disposed adjacent the brake drum, and a spring disposed between the weight and brake pad.

5. The system of claim 1 wherein the brake drum has a fine continuous spiral thread cut into an inside surface there, and wherein the brake pads are adapted to ride on the spiral thread to assist in controlling the rate of rotation of the regulator.

6. The system of claim 1 wherein the transverse movement of the regulator along the wedge-shaped tube maintains a desired distance between the regulator and the tow line and controls the speed of the regulator as the stowed height of the tow line is reduced due to payout thereof.

* * * * *